No. 695,922. Patented Mar. 25, 1902.
B. F. FOWLER.
COIN CONTROLLED APPARATUS.
(Application filed Feb. 15, 1901.)
(No Model.)
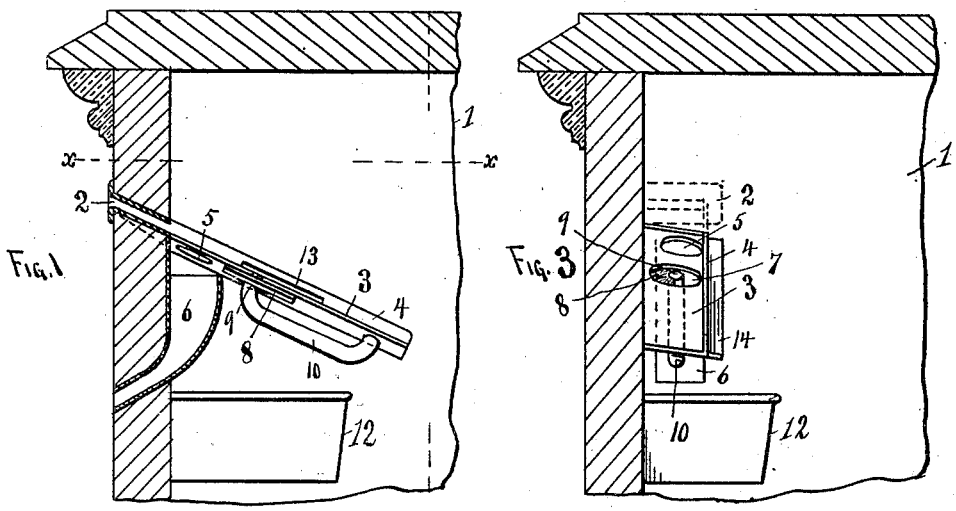
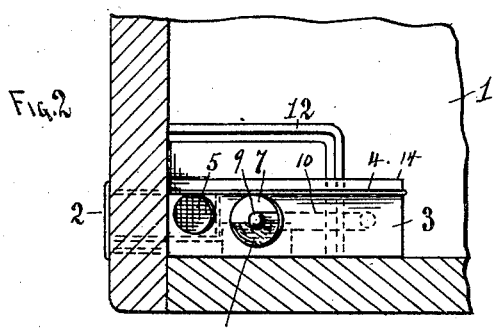
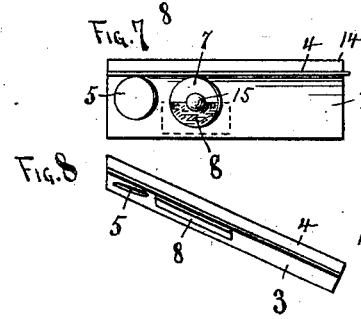
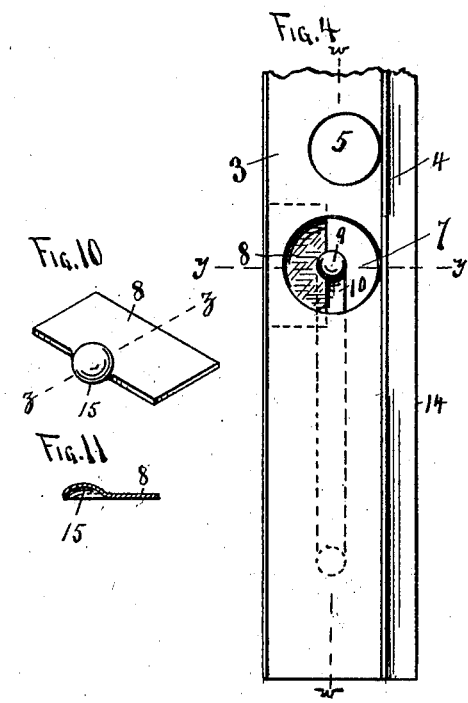
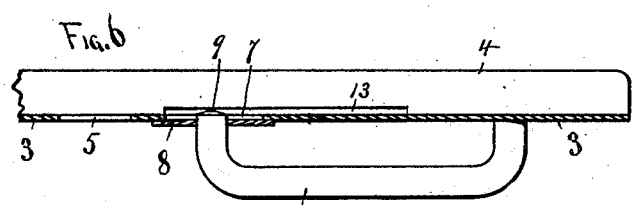
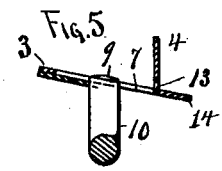
WITNESSES.
Benjamin F. Fowler INVENTOR
BY Charles N. Woodward. ATTORNEY
THE NORRIS PETERS CO., PHOTO-LITHO., WASHINGTON, D. C.

UNITED STATES PATENT OFFICE.

BENJAMIN F. FOWLER, OF MINNEAPOLIS, MINNESOTA.

COIN-CONTROLLED APPARATUS.

SPECIFICATION forming part of Letters Patent No. 695,922, dated March 25, 1902.

Application filed February 15, 1901. Serial No. 47,485. (No model.)

*To all whom it may concern:*

Be it known that I, BENJAMIN F. FOWLER, a citizen of the United States, residing at Minneapolis, in the county of Hennepin and State of Minnesota, have invented certain new and useful Improvements in Coin-Controlled Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

Figure 1 is a sectional detail of a portion of the casing and the coin-duct of a coin-controlled apparatus, illustrating my invention. Fig. 2 is a plan view of the parts shown in Fig. 1 in section on the line $x\,x$ of Fig. 1. Fig. 3 is a sectional detail showing the parts illustrated in Fig. 1 viewed from inside the machine. Fig. 4 is an enlarged plan view of the coin-duct detached. Fig. 5 is a cross-section on the line $y\,y$ of Fig. 4. Fig. 6 is a longitudinal section on the line $w\,w$ of Fig. 4. Figs. 7, 8, and 9 are detail views of the coin-slide, illustrating modifications in the construction. Fig. 10 is a perspective view of the stop-plate detached, illustrating the form employed in the modification shown in Figs. 7, 8, and 9. Fig. 11 is a cross-section on the line $z\,z$ of Fig. 10.

This device may be employed in connection with any of the different forms of coin-controlled apparatus either inside the casing or in a separate casing outside the machine. It may be arranged as an attachment to machines already built or built in as part of the apparatus in constructing new machines. For the purpose of illustration I have shown the invention arranged inside the casing of the machine.

The invention is intended to detect and prevent fraud by catching disks or washers either of the size of and thinner than the coin or smaller than the coin and prevent them from passing to the tripping mechanism.

1 represents the casing of the machine, through one side of which the coin-slot 2 is inserted, as shown. Leading from the coin-slot 2 or formed as a continuation thereof is a plate or slide 3, set at an incline both transversely and longitudinally and with a stop-rib 4 projecting vertically near its lower edge, as shown more clearly in Fig. 5. The longitudinal incline of the plate is sufficient to insure the descent of the coin, while the transverse incline and the stop-rib 4 are designed to insure the passage of the coin along one edge only of the plate, as the gravity of the coin will carry it down the inclined plate next to the rib 4, as will be readily understood. The longitudinal incline of the plate 3 will be just sufficient to cause the coin to travel slowly along its surface by gravity and conducted thereover to the tripping mechanism in any desired manner, according to the requirements of the mechanism with which it is connected; but as this tripping mechanism is no part of the present invention it is not illustrated here.

The plate 3 is provided with an opening 5 near the inlet 2, which is smaller in diameter than the legitimate coin which it is designed shall actuate the tripping mechanism, so that if any article of a less diameter than the coin is inserted (such, for instance, as a small washer, which is commonly used in attempts to commit frauds on machines of this character) the smaller fraudulent article will fall through the opening 5, and thus be prevented from passing to the tripping mechanism.

Beneath the small opening 5 is a duct 6, which leads either downward or outward, so that the small articles will pass through and fall inside or outside the machine through the casing or otherwise without passing to or upon the tripping mechanism. Below the aperture 5 is another aperture 7, which is just the size of the coin which it is designed to employ, but which is provided with a plate 8, which covers nearly one-half of the aperture 7, as shown.

Projecting upward centrally into the aperture 7 and partially inclosed by the plate 8 is the end 9 of a pin 10, the end 9 projecting slightly above the general surface of the plate 3 and rounded off, as shown in Figs. 5 and 6, so that the projecting part will simply offer a slight resistance to the passage of the coin, but will not prevent it from passing over the aperture 7, the point 9 supporting the coin while it passes over the aperture and preventing it from falling through. If, however, a washer of the same size as the coin be inserted, it will pass over the smaller aperture 5, and the lower edge of the coin will strike the projecting end 9 of the pin 10 and pass over it; but the aperture in the washer will allow it to fall over the end of the stud 10 and be retarded thereby, and so fall into the aperture 7 and tilt over sidewise over the edge of the stop-plate 8 and fall through the aperture 7 into a receptacle 12, and thus be prevented from passing to the tripping mechanism.

13 is a long thin aperture in the lower edge of the rib 4 next the plate 3 to afford means for the escape of any article thinner than a coin and of the same diameter, such as a thin disk of tin. If such a thin disk be inserted, it will run down the inclined plate 3 in contact with the rib 4, and when it arrives at the opening 13 it will pass through this opening and fall into the receptacle, and thus be prevented from passing to the tripping mechanism. The projecting part 14 of the plate 3 affords a support to the thin disks as they pass through to assist their passage and prevent them from tilting up and sticking in the opening 13.

In Figs. 7 to 11 a slight modification is shown in the construction of the stop-plate 3, wherein the pin 10 is replaced by an extension 15 on the plate 8, the extension being rounded upward to project above the general surface of the plate 3 in the same manner and for the same purpose as the end 9 of the pin 10 is elevated and rounded on its upper surface, as before described.

By the use of this simple device no article other than a coin or check of a certain predetermined diameter and thickness can find its way to the tripping mechanism; but all such spurious articles will be disposed of, as above described.

Having thus described my invention, what I claim as new is—

1. In a coin-controlled apparatus, an inclined plate over whose surface the coin is adapted to pass and with an aperture therethrough substantially equal to the diameter of the coin, a stop-plate covering a portion of the under side of said aperture, and a projection centrally of said aperture and extending a short distance above the surface of said plate, whereby washers or other perforated spurious articles are retained and caused to fall through said aperture, substantially as set forth.

2. In a coin-controlled apparatus, a plate inclined longitudinally and transversely and with a guard-rib projecting vertically therefrom at a point at or near its lowermost edge and down which plate the coin is adapted to move with one edge in contact with said rib, said plate having an aperture substantially equal to the diameter of the coin, a stop-plate covering a portion of the under side of said aperture, and a projection centrally of said aperture and extending a short distance above the surface of said plate, whereby washers or other perforated spurious articles are caused to pass down said plate in uniform lines and retained and caused to fall through said aperture, substantially as set forth.

3. In a coin-controlled apparatus, a plate inclined longitudinally and also transversely, and with a guard-rib projecting vertically therefrom near its lowermost edge and down which plate the coin is adapted to move with one edge in contact with said rib, said rib having an aperture next the plate of a less width than the thickness of the legitimate coin and set upon said plate back from its lower edge whereby any spurious article thinner than the legitimate coin will pass through said contracted opening, and a projection, 14, provided to support said spurious article and insure its escape.

In testimony whereof I affix my signature in presence of two witnesses.

BENJAMIN F. FOWLER.

Witnesses:
D. S. WALTERMIRE,
A. C. MIDDELSTADT.